US007049298B2

(12) United States Patent
Kochhar et al.

(10) Patent No.: US 7,049,298 B2
(45) Date of Patent: May 23, 2006

(54) FLAVOR-ACTIVE PEPTIDES

(75) Inventors: Sunil Kochhar, Savigny (CH); Carl Erik Hansen, Epalinges (CH); Marcel Alexandre Juillerat, Lausanne (CH)

(73) Assignee: Nestec S.A., Vevey (CH)

( * ) Notice: Subject to any disclaimer, the term of this patent is extended or adjusted under 35 U.S.C. 154(b) by 45 days.

(21) Appl. No.: 10/812,088

(22) Filed: Mar. 30, 2004

(65) Prior Publication Data

US 2004/0224077 A1 Nov. 11, 2004

Related U.S. Application Data

(63) Continuation of application No. PCT/EP02/10031, filed on Sep. 6, 2002.

(30) Foreign Application Priority Data

Oct. 1, 2001 (EP) .................................. 01123585

(51) Int. Cl.
*A61K 38/00* (2006.01)

(52) U.S. Cl. ....................................................... 514/19
(58) Field of Classification Search ................... 514/19
See application file for complete search history.

(56) References Cited

U.S. PATENT DOCUMENTS 5,753,296 A * 5/1998 Girsh .......................... 426/593

FOREIGN PATENT DOCUMENTS

| EP | 1008 305 A1 | 6/2000 |
|---|---|---|
| WO | WO 96/38472 | 12/1996 |
| WO | WO 00/22935 | 4/2000 |

OTHER PUBLICATIONS

Davies, et al. The Maillard Reaction application to Confectionery Products, Confectionary Science, 1997, pp. 1-33, http://courses.che.umn.edu/00scn8334__If/FSCN8334__Reading.html, last updated Sep. 26, 2000.*
Otagiri, et al., Studies on a Model of Bitter Peptide Including Arginine, Proline, and Phenylalanine Residue, Agric. Biol. Chem., 1985, vol. 49, No. 4, pp. 1019-1026.*
Nosho, et al. Studies on a Model of Bitter Peptides including Arginine, Proline, and Phenylalanine Residues, Peptide Chemistry 1984, pp. 323-328.*
Kouge, et al., Relationship between Bitterness and Chemical Structure of Cyclic Dipeptides, Peptide Chemistry, 1978, pp. 105-108.*
The Cambridge Advanced Learner's Dictionary, Cambridge University Press, 2004, p. 1, http://dictionary.cambridge.org/define.asp?key=70004&dict=CALD, printed Jun. 8, 2004.*

The American Heritage Dictionary of the English Language: Fourth Edition, 2000, pp. 1-2, http://www.bartleby.com/61/74/S107400.html, printed Jun. 8, 2004.*
Infoplease Dictionary, 2000-2005, p. 1, http://www.infoplease.com/dictionary/savor, printed Jun. 8, 2004.*
Encarta World English Dictionary, North American Edition, 2005, pp. 1-2, http://encarta.msn.com/encnet/features/dictionary/DictionaryResults.aspx?refid=1861674021.*
Dorland's Illustrated Medical Dictionary, W.B. Saunders, 2002, pp. 1-16, esp. p. 9, http://www.merksource.com/pp/us/cns__hi__dholands.jspzQzpgzEzzSzp-pdocszSzuszSzcommonzSzdorian..., printed Jun. 8, 2005.
Cambridge Advanced Learner's Dictionary, Cambridge University Press, 2004, pp. 1-2, http://dictionary.cambridge.org/define.asp?key=29532&dict=CALD, printed Jun. 8, 2004.
Hormel Glossary, 1999-2005, p. 1, http://www.hormel.com/kitchen/glossary.asp?ProcessPrint=true&Print/Category=glossary&Pr..., printed Jun. 8, 2005.
Keil, et al., Identification of the Bitter Principle of Cocoa, Helvetica Chimica Acta, 1975, vol. 58, Iss. 4, 1975, pp. 1078-1086.*
Bonvehi, et al., Evaluation of Purine Alkaloids and Diketopiperazines Contents in Processed Cocoa Powder, Eur. Food Res. Technol., 2000, vol. 210, pp. 189-195.*
Yu-Chiang Oh, Flavor Chemistry of the Maillard Reaction of Dipeptides, Rutgers The State University of New Jersey—New Brunswick, 1992, pp. 1-154.*
Voigt et al: XP002106204, "In-Vitro Formation Of Cocoa-Specific Aroma Precursors: Aroma-Related Peptides Generated From Cocoa-Seed Protein By Co-Operation Of An Aspartic Endoprotease And A Carboxypeptidase", Elsevier Science Publishers Ltd, Food Chemistry, vol. 49, No. 2, pp. 173-180 (1994).
Voigt et al: XP001039556, "The Proteolytic Formation Of Essential Cocoa-Specific Aroma precursors Depends On Particular Chemical structures Of The Vicilin-Class Globulin of The Cocoa Seeds Lacking In The Globular storage Proteins Of Coconuts, Hazelnuts And Sunflower Seeds", Elsevier Science Publishers Ltd, Food Chemistry, vol. 51, No. 2, pp. 197-205 (1994).
Elif Buyukpamukcu et al, XP002191849, "Characterization Of Peptides Formed During Fermentation Of Cocoa Bean.", Journal Of Agricultural And Food Chemistry, vol. 49, pp. 5822-5827 (2001).

* cited by examiner

*Primary Examiner*—Bruce R. Campell
*Assistant Examiner*—Jennifer Ione Harle
(74) *Attorney, Agent, or Firm*—Bell, Boyd & Lloyd LLC

(57) ABSTRACT

The present invention pertains to specific peptides obtainable from cocoa beans and giving rise to a particular and distinct savor when subjected to a Maillard reaction with reducing sugars. In particular, the present invention pertains to the use of one or more of these specific peptides for the preparation of a chocolate flavor, specifically a cocoa and a caramel flavor, a floral or specifically, a bonbon flavor, a bready flavor, a roasted flavor or a meat flavor.

12 Claims, 3 Drawing Sheets

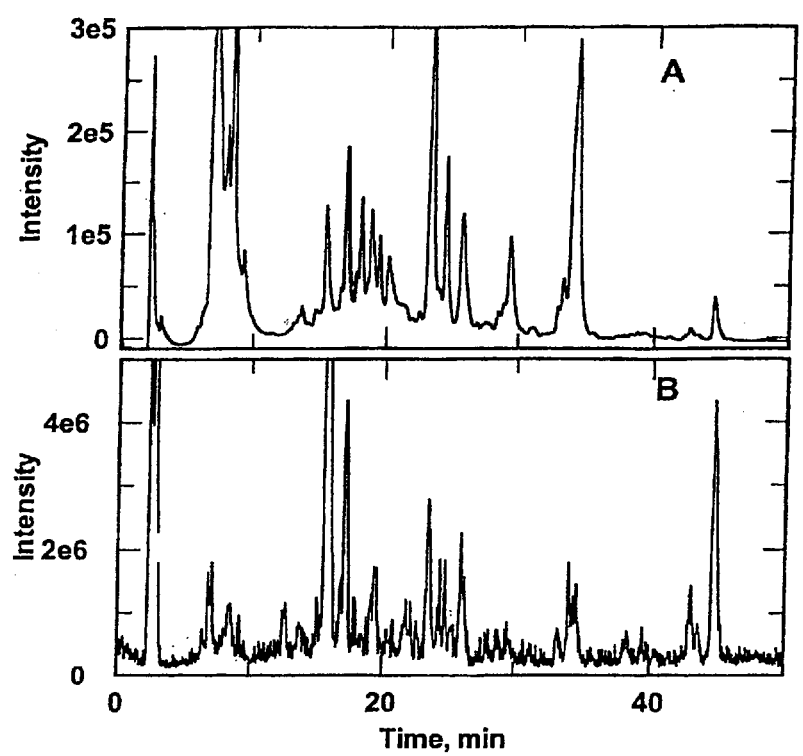
Figure 1. UV and total ion current profile of the RP-HPLC/ESI-MS of CNP extract of 5-day fermented cocoa bean. A, UV profile at 260 nm; B, TIC. The LC/ESI-MS conditions are described in "Experimental Procedures".

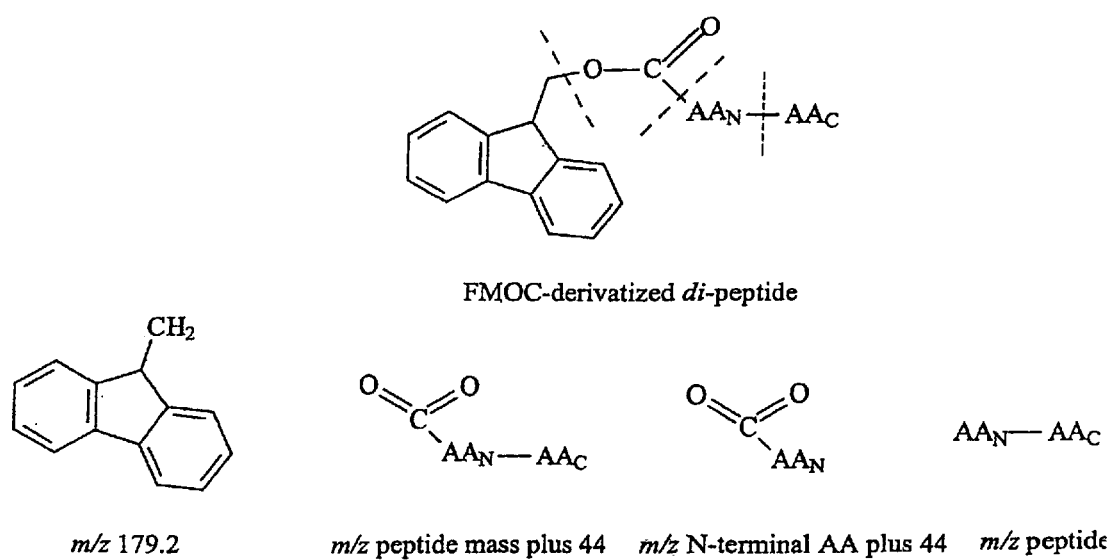
Figure 2. Fragmentation pattern of FMOC-derivatized peptides in MS/MS analysis.

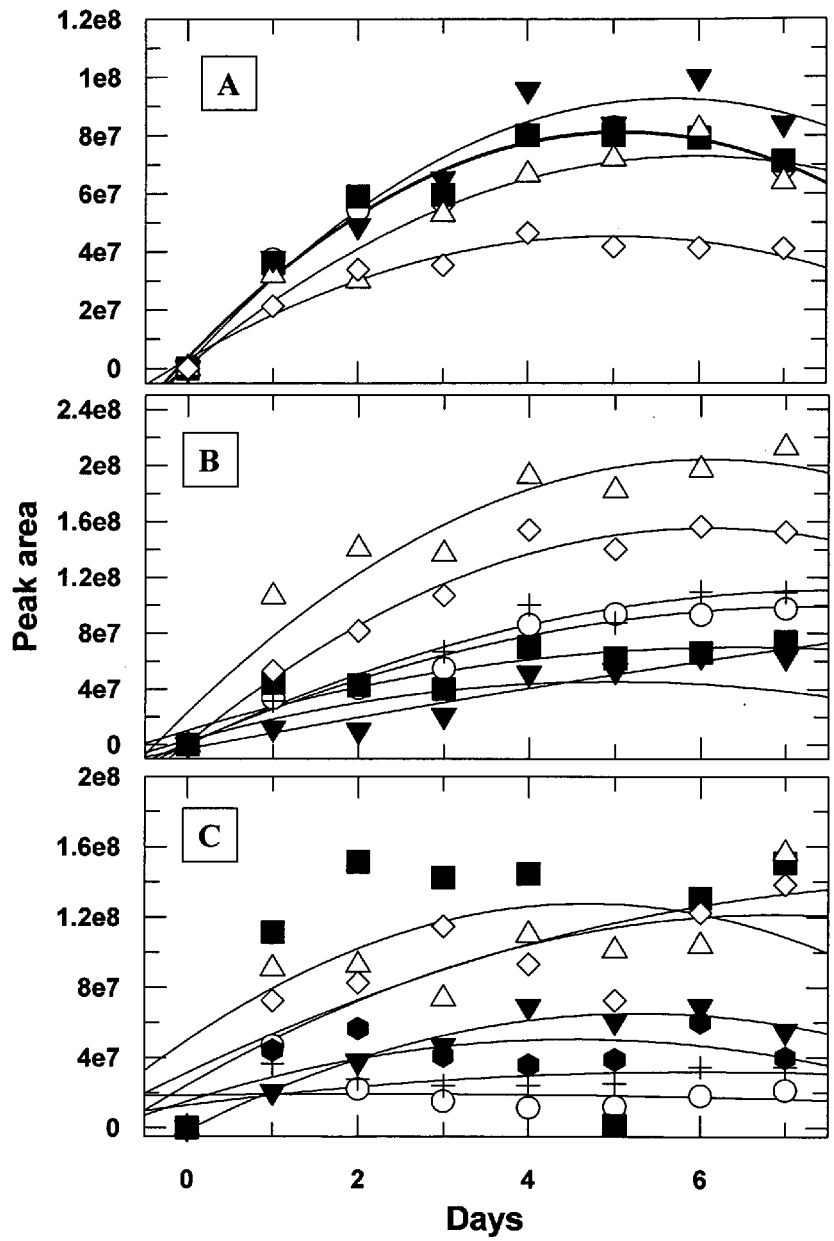

Figure 3. Quantitative analysis of di-peptides at different stages of fermentation. A, peptide pool whose concentration gradually increases to maximum within 3-4 days followed by net decrease during 6-7-day of fermentation ((▲)YV/VY, (β)AF, (X)AY, (δ)VF/FY, (E)MY); B, peptide pool whose concentration reaches a plateau in 5-7 days with no further change (( )RF/FR, (β)IT/LT, (X)AD, (δ)WA/AW, (E)FL, (φ)MY, (γ)LL/YL/LY), and C, peptide pool whose concentration does not change after 1-2 days of fermentation (( )EK, (β)AV, (X)EA, (δ)KF, (E)VP, (φ)FK, (γ)KV).

US 7,049,298 B2

FLAVOR-ACTIVE PEPTIDES

CROSS-REFERENCE TO RELATED APPLICATION

This application is a continuation of International Application PCT/EP02/10031 filed Sep. 6, 2002, the entire content of which is expressly incorporated herein by reference thereto.

BACKGROUND OF THE INVENTION

The present invention pertains to specific peptides obtainable from cocoa beans and giving rise to a particular and distinct savor when subjected to a Maillard reaction with reducing sugars. In particular the present invention pertains to the use of such specific peptides for the preparation of a chocolate flavor, specifically a cocoa and a caramel flavor, a floral or more specifically, a bonbon flavor, a bready flavor, or a roasted or meaty flavor.

The typical cocoa flavor emanates during processing of cocoa beans which processing comprises fermentation, drying and roasting.

During fermentation, the cocoa seed proteins are degraded by microbiological and enzymatic processes to yield mainly hydrophilic peptides and hydrophobic amino acids, which serve as flavor precursors for the unique chocolate flavor. The cocoa proteolytic system involved in these processes is highly efficient. The endogenous proteolytic activity in cocoa is represented by endoproteases, amino-peptidases and carboxypeptidases, which in concert have the capability to hydrolyze intact protein to single amino acids and oligopeptides of different length.

During roasting, various chemical reactions occur, such as Maillard-type reactions and thermal degradation reactions (decarboxylations, deaminations, oxidations etc.). The Maillard reaction involving peptides, amino acids and reducing sugars generates compounds that are deemed to eventually contribute to the final cocoa/chocolate flavor.

In the recent past, more and more evidence has been brought up that the size of the peptides and their amino acid contents/sequence play an important role in flavor development. The amino acid pool in non-roasted and roasted fermented cocoa has been investigated and certain hydrophobic amino acids have been found to be implicated in the generation of cocoa flavor (Seiki, Rev. Int. Choc. 28 (1973) 38–42). However, the identification of naturally occurring peptides is quite difficult due to the presence of free amino acids and polyphenols in the cocoa beans. As a consequence, little is known in the art so far about the nature of the short-chain peptides that are present in the cocoa peptide pool.

Several attempts have been made to artificially produce cocoa flavor. One such attempt comprises subjecting acetone dried powder prepared from unfermented ripe cocoa beans to an autolysis at a pH of 5.2 followed by roasting in the presence of reducing sugars (Voigt et al., Food Chem. 49 (1994), 173–180). Mohr et al. report in Fette Seifen Anstriche 73 (1971), 515–521, about the isolation of a peptide fraction showing potential for chocolate flavor formation. Moreover, Voigt et al. report in several articles in Food Chem. 51 (1994), 7–14; 177–184; and 197–205, about the production of a peptide-enriched pool of flavor precursors using purified storage proteins and endogenous cocoa proteolytic system, which precursors upon thermal reaction with reducing sugars resulted in a chocolate like flavor.

It had also been recognized that thermal reactions of a mixture of fructose/glucose, and hydrophobic amino acids under low water activity medium, e.g. glycerol or propylene glycol etc., gives rise to a chocolate-like aroma. Using this type of reaction flavor as a base and combining it with certain top notes, most prominent vanilla, chocolate-like flavor concentrates could be produced. However, due to the complex nature of these reactions, a clean and well-balanced chocolate flavor concentrate is difficult to obtain, also creating the problem of providing a constant quality.

Pertinent to the development of process reaction flavors for chocolate, Schnermann et al. report in "Evaluation of key odorants in milk chocolate and cocoa mass by aroma extract dilution analyses" (J. Agric. Food Chem. 45, (1997), 867–872) of the identification and characterization of volatile compounds from cocoa or chocolate products. The overall objective of the volatile mapping studies was to "compound" an intense artificial chocolate aroma with a high degree of flexibility so as to customize flavor profiles of chocolate or chocolate products. However, so far attempts to reconstitute the aroma of chocolate have not been successful. Although the synthetic mixtures obtained are reminiscent of chocolate, they lack the body and the intensity of a typical chocolate flavor.

At present, the currently available artificial chocolate flavors lack the desired intensity of chocolate aroma and an appropriate body. Consequently, a problem exists in that no means are known for artificially producing chocolate flavor that has all components of a typical chocolate aroma and an appropriate body. The present invention now seeks to overcome this problem.

SUMMARY OF THE INVENTION

During the extensive studies leading to the present invention, it has now been surprisingly recognized that cocoa beans contain a variety of different peptides giving rise to a savor not expected to occur in or be obtained from cocoa beans. In a first aspect, the present invention therefore pertains to flavor active compounds all derivable from cocoa beans and obtainable by subjecting one or more peptides selected from the group consisting of Arg-Phe, Ala-Glu, Glu-Ala, Val-Ala, Phe-Glu, Thr-Leu, Tyr-Val, Val-Tyr, Pro-Val, Asp-Ala, Ala-Asp, Trp-Ala, Ala-Asp, Trp-Ala, Phe-Ala, Ala-Phe, Tyr-Ala, Ala-Tyr, Lys-Glu, Lys-Phe, Val-Lys, Val-Phe, Leu-Leu, Met-Tyr to a Maillard reaction with reducing sugars.

According to a preferred embodiment, the present invention provides compounds obtainable by subjecting one or more peptides selected from the group consisting of Leu-Leu, Val-Tyr, Tyr-Val, Ala-Phe, Ala-Asp, Val-Phe, Val-Lys, Leu-Leu or Val-Tyr to a Maillard reaction with reducing sugars, which compounds yield a chocolate flavor composed of a cocoa and/or caramel aroma.

According to an alternative embodiment of the invention, the peptides are chosen from the group consisting of Leu-Leu, Val-Tyr, Tyr-Val, Ala-Phe or Ala-Asp, as these have been found to particularly yield an excellent aroma and an appropriate body. According to a preferred embodiment, the peptides which yield the best cocoa flavor are Val-Tyr, Tyr-Val, or Leu-Leu. In another embodiment, the peptides are chosen from the group consisting of Val-Phe or Val-Lys to provide a caramel flavor. According to yet another embodiment, the peptide to be subjected to the Mallard reaction is Met-Thr, as this has been found to yield an excellent and strong meat flavor.

Suitable reducing sugars to be reacted with the peptides listed above include fructose, glucose, xylose, maltose, lactose, fucose, arabinose, galactose and rhamnose. The sugars and the peptides are preferably reacted in a non-aqueous solvent, such as glycerol, propylene glycol, low water activity aqueous systems, ethanol, or fats at elevated temperatures and under conditions that allow a binding of the sugars to the peptides.

According to another embodiment of the invention, a process for preparing a desired flavor, in particular a chocolate flavor, a cocoa flavor, a caramel or bready or biscuit flavor or a meat flavor is provided, which comprises subjecting one or more of the peptides selected from the group consisting of Arg-Phe, Ala-Glu, Glu-Ala, Val-Ala, Phe-Glu, Thr-Leu, Tyr-Val, Val-Tyr, Pro-Val, Asp-Ala, Ala-Asp, Trp-Ala, Ala-Asp, Trp-Ala, Phe-Ala, Ala-Phe, Tyr-Ala, Ala-Tyr, Lys-Glu, Lys-Phe, Val-Lys, Val-Phe, Leu-Leu, Met-Tyr to a Maillard reaction with reducing sugars. The compounds obtained from the Maillard reaction, or generically the peptides listed, may be used for the preparation of any product, wherein an aroma provided by the subjective compounds is desired, such as food products, cosmetic products or pharmaceutical products. Examples of food products are dairy products, any sort of milk products, such as e.g. milk, yogurt, pudding, ice cream or confectionery products, such as chocolate. Likewise baby food in general, or even pet food may be aromatized with the flavor compounds of the present invention. In particular, the acceptance of any pet food by the animal may be enhanced by raising its meat taste adding a compound of the present invention to the food.

BRIEF DESCRIPTION OF THE DRAWING FIGURES

In the figures,

FIG. 1 shows an UV and total ion current profile of the RP-HPLC/ESI-MS of CNP extract of 5-day fermented cocoa bean;

FIG. 2 shows the fragmentation pattern of FMOC derivatized peptides in MS/MS analysis; and FIG. 3 shows a quantitative analysis of dipeptides at different stages of fermentation.

DETAILED DESCRIPTION OF THE PREFERRED EMBODIMENTS

In the studies leading to the present invention, the present inventors have devised a novel method for isolating and detecting peptides from the natural peptide pool in cocoa beans, which was hitherto not considered to be possible to a sufficient extent.

An analysis of a cocoa nib powder (CNP) extract by electrospray ionization (ESI) mass spectrometry interfaced with RP-HPLC using chromatography conditions employing a trifluoroacetic acid/acetonitrile (TFA/ACN) solvent system, resulted in the detection of only few masses due to relatively low abundance of most of the ions ($1-6\times10^4$). This was deemed to be due to poor ionization of "naked" free amino acids and short-chain peptides. Pre-column derivatization with FMOC followed by LC/MS analysis of the CNP extract resulted in a detection of numerous peaks (FIG. 1). A list of the total monoisotopic ions present was elaborated and based upon the known retention times and molecular ion masses of the amino acids, a mass list of potential peptides was drawn (Table 1). All of the unknown masses upon subtraction of mass unit of 222 due to FMOC moiety showed a positive match in the synthetic peptide database of up to 5 residues.

TABLE 1

Identification of suspected peptide masses in CNP extract by LC/MS[a]

| Retention time, min | Molecular mass ions [M + H]+ |
|---|---|
| 13.50–19.2 | 551.1, 625.3, 840.4 |
| 19.33–19.5 | 510.3, 707.2 |

TABLE 1-continued

Identification of suspected peptide masses in CNP extract by LC/MS[a]

| Retention time, min | Molecular mass ions [M + H]+ |
|---|---|
| 19.5–22.0 | 516.2 |
| 22.18–22.38 | 631.1 |
| 22.4–22.57 | 326, 544.4, 755.8 |
| 22.9–23.24 | 441.1, 512.0 |
| 24.13–24.34 | 706.5, 526.0, 403.8, 801.0 |
| 24.4–26.5 | 411, 455.1 |
| 26.61–26.81 | 503.0, 517.1 |
| 27.24–27.62 | 437.1 |
| 28.14–30.5 | 425, 498.1, 459 |
| 31.6–31.96 | 427.0, 487.1, 876.4 |
| 32.43–33.29 | 353.9, 387.9, 453.0, 572.3 |
| 33.5–34.99 | 467.1, 501, 735.1 |
| 35.1–36.88 | 535, 850.1 |
| 37.98–38.49 | 749.1, 791.1, 678.1 |
| 39.41–39.85 | 720.2, 883.1 |
| 40.22–40.71 | 692.1, 697.2 |
| 41.33–42.01 | 759.1, 800.2 |
| 45.59–46.06 | 690.2 |
| 48.59–49.08 | 738.2 |

[a]From FIG. 1. The masses in bold upon ms/ms analysis showed the presence of typical molecular ion m/z 179 from the FMOC moiety.

TABLE 2

Identification and characterization of peptides by tandem MS/MS

| Retention time, min | Molecular ions [M + 1]+ | Peptide mass | Peptide Sequences |
|---|---|---|---|
| 14 | 840.4 | 617.4 | RGTVVS |
| 19 | 625.3 | 402.3 | IRD |
| 19.6 | 510.3 | 287.3 | IR |
| 20.49 | 516.2 | 293.2 | KF |
| 22.5 | 544.4 | 321.4 | RF or FR |
| 22.8 | 441.1 | 218.1 | EA |
| 25.3 | 411 | 188 | AV |
| 25.25 | 517.1 | 294.1 | EF or FE |
| 24.7 | 455.1, 437.0[b] | 232.1 | IT or LT |
| 25.3 | 503.1 | 280.1 | YV or VY |
| 26.1 | 437.1 | 214.1 | VP |
| 27.1 | 425 | 202 | AD |
| 28.49 | 498.1 | 275.1 | WA or AW |
| 29.7 | 459 | 236 | AF |
| 31.7 | 876.4 | 653.4 | EEETF |
| 32 | 487.1 | 264.1 | VF or FV |
| 33.5 | 467.1 | 244.1 | LL, LY or YL |
| 35 | 501 | 278 | FL |
| 36 | 535 | 312 | MY |
| 40 | 697.2 | 253.2 | AY |
| 40 | 720.2 | 497.2 | EK |
| 43 | 690.2 | 467.2 | KV |
| 46 | 738.2 | 515.2 | FK |

[b]Molecular ion minus water molecule.

In order to determine the amino acid sequence of peptides, collision-induced fragments of derivatized peptides was performed. The fragmentation pattern of the each peptide was analyzed manually. As indicated, FMOC derivatization of amino acids and peptides introduces an additional mass of 222. During MS/MS, major fragmentation of the derivatized peptide observed was as follows: a monoisotopic ion m/z 179.2±0.1 corresponding to the loss of aromatic moiety of the FMOC (see FIG. 3). The loss of m/z 179 produced an ion of the peptide mass plus 44 corresponding to O—C~O moiety of FMOC (FIG. 3). Further fragmentation observed were the loss of C-terminal amino acid producing a molecular ion corresponding to the N-terminal amino acid plus 44 mass units revealing the identify of peptide sequence. Additionally, a simultaneous loss of 44 mass units produced the molecular ion of the peptide. Similar observation of the fragmentation pattern was made in cases of peptides carrying additional moieties of FMOC due to the presence of Lys or Tyr residues.

Using the above mentioned strategy in assigning both the N-terminal and the C-terminal amino acids in short-chain peptides resulted in identification of 23 peptides; 20 dipeptides, 1 tri-peptide, 1 penta-peptide, and 1 hexa-peptide. However in the case of dipeptides composed of isobaric amino acids in the, e.g. Gin and Lys or Ile and Leu, no clear identification of the N- or C-terminal amino acid could be assigned.

The fate of each of the identified peptide was charted during the course of the fermentation time period. The data is presented in FIG. 3. As expected none of the peptide was present in the unfermented bean. However, most of the identified peptides could be detected in a one-day fermented bean. A quantitative analysis of the peptides in fermented beans (1–7 days) show that for a set of peptides (group A) their concentration reaches a plateau between 3–5 days of fermentation followed by small but distinctive decrease in the concentration. Another group of peptides (group B) after having reached a maximum concentration between 3–5 days shows no further change. Group C peptides reached their maximum concentration within 1–2 days of fermentation with no further change during prolonged fermentation. These data show that the identified peptides appear uniquely upon the fermentation of the cocoa beans.

A computer search of the amino acid sequence of the identified peptides against the cocoa storage protein sequence database (2S and 21-kDa albumin, and 10-, 14-, 37-, 41-kDa vicillin polypeptides) showed 100% match to each of the peptides. The data unequivocally show that all of the identified peptides are of cocoa origin and result from storage protein degradation.

In order to evaluate the chocolate flavor potential of the identified cocoa di-peptides, synthetic analogs of the compounds identified above. A total of 36 di-peptides were investigated (table 3). In order to understand peptide-based Maillard reaction, the N-terminal amino acid of each peptide was swapped with its C-terminal amino acid. All of the peptides were tested in the process reaction.

Initially all of the samples were evaluated by sniffing them on multiple occasions. The data is presented in table 3. A set of 11 peptide samples was selected for a large scale olfactory evaluation. Based on the olfactory evaluation, the di-peptides, Val-Tyr and Tyr-Val showed clearly a balanced chocolate aroma. Surprisingly, chocolate aroma from Tyr-Val was more intense as compared to Val-Tyr.

TABLE 3

Evaluation of the aroma profile of the peptide-based reaction flavors

| Peptide | Aroma attributes | Peptide | Aroma attributes |
|---|---|---|---|
| IR | spicy, off-notes | AF | caramel, fruity |
| RI | spicy, off-notes | YA | caramel, off notes |
| KF | Off-notes | AY | chocolate |
| FR | Off notes | KE | bready, nutty, roasted, chocolate |
| RF | caramel, bready | EK | off-notes |
| AE | mild caramel, | KF | strong caramel |
| EA | mild caramel | VK | caramel, |
| AV | off-notes | KV | off-notes |

TABLE 3-continued

Evaluation of the aroma profile of the peptide-based reaction flavors

| Peptide | Aroma attributes | Peptide | Aroma attributes |
|---|---|---|---|
| VA | caramel, off-notes | FV | off-notes |
| FE | caramel, off-notes | VF | caramel |
| TL | off-notes, meaty | LL | Fruity, cocoa, floral |
| YV | Balanced Chocolate, , | LY | off-notes |
| VY | chocolate, slight off-notes, | YL | off-notes |
| PV | roasted, Bready | LF | off-notes |
| VP | off-notes | FL | off-notes |
| DA | off-notes, caramel | MY | strong meat note |
| AD | biscuit, caramel | YM | NCA |
| WA | caramel, spicy, off-notes | FK | NCA |
| AD | biscuit, caramel | EF | NCA |
| WA | caramel, spicy, off-notes | LT | NCA |
| AW | off-notes | IT | NCA |
| FA | caramel, off-notes | TI | NCA |

The most promising peptide based on the type aroma notes from their process reactions is filled with gray color.

EXAMPLES

The following examples illustrate the invention without limiting it thereto

Example 1

Good quality West African Amelonado cocoa beans were fermented in 80 kg heaps covered with banana leaves at Abengoorou Idefor farm in Ivory Coast. Samples were removed at 1 day intervals during 7 day fermentation period, sun dried, hand peeled and shipped to NRC/Lausanne. The cocoa beans were kept at −20° C.

Synthetic peptides were obtained from Bachem. HPLC grade acetonitrile, methanol and water were from Merck. Trifluoroacetic acid, triethylamine, and fluoroscamine from Fluka.

Preparation of Soluble Peptide Extract

Dried cocoa beans were passed through a bean crusher (Brook Crampon) followed by a winnower (John Gordon) to remove shells. The nibs were kept in a brown bottle at −20° C. Cocoa nibs (20–30 g) were milled for few seconds in an universal mill (IKA, M-20). The nib powder was passed through 0.8-mm sieve and kept at 4° C. (NRC reference14C181-0 to 14C18-7).

Cocoa nib powder (1 g) was suspended in 10 ml extraction solvent (30% (v/v) methanol/0.1% (v/v) TFA). The suspension was subjected to homogenization treatment for 1 min at a maximum speed (Polytron, Kinematica AG) and centrifuged at 15,000 rpm at 4° C. for 15 min. The clear supernatant was carefully removed, passed through 0.22 μm filter disc and lyophilized. The dry powder was solublized in 5% AcA, passed through 0.22 μm filter disc and kept in aliquots at −20° C.

Derivatization with FMOC

Soluble peptide extract (50–100 μl) or synthetic peptides and amino acids solution (10–40 nmol/100 μl) was mixed with 400 μl borate buffer (0.1 M, pH 10.4). The solution was mixed vigorously with FMOC reagent (500 μl, 5.8 mM in acetone) (Einarsson et al., J. Chromatogr. 66 (1983), 3688–3695). The mixture was extracted 2-times with 2 ml of pentane-ethylacetate (80:20). The aqueous phase containing the FMOC-derivatives was analyzed by RP-HPLC interfaced with an ESI mass spectrometer.

LC-MS Analysis

Mass measurements and peptide fragmentation were made using a FinniganMat ion-trap LCQ mass spectrometer interfaced with Spectra HPLC system (FinniganMat). The system consisted of a quaternary pump (TSP P4000), an autoinjector (TSP AS3000) and a UV/VIS detector (model UVIS 205 from Linear Instruments) equipped with a high-pressure stainless steel flow cell (1.6 μl volume, 2 mm pathlength). The LC flow was directed to LCQ mass spectrometer without using a flow-splitter. Typically the following conditions were used: capillary temperature, 200° C., sheath gas flow, 70; auxiliary gas flow, 10; source voltage, 5 kV. Other parameters were adjusted automatically during the calibration/tuning procedure as recommended by the manufacture. For MS/MS analysis of the most intense ions, the collision-induced dissociation energy was set to 35%. The mass selection and cut-off windows for the most intense ions were 1 mass unit.

Underivatized samples were analyzed using RP $C_{18}$ column (Nucleosil 100-3 $C_{18}$ HD; 3 μm, 2×150 mm, Macherey-Nagel) with a linear gradient increase of solvent B (0.05% TFA/80% ACN (v/v) in water) in solvent A (0.045% TFA (v/v) in water) as follows: 10 min isocratic elution at 0% B, 0–25% B in 25 min, 25–50% B in 10 min, 50–100% B in 5 mi followed by isocratic elution at 100% B for 5 min. The flow rate was 0.2 ml/min and detection at 215 nm. The FMOC-derivatives were separated on the same column using a linear gradient: 0–35% B in 5 min, 35–100% B in 65 min and isocratic elution at 100% B for 5 min. The flow rate was 0.2 ml/min and detection was accomplished at 260 nm.

Peptide Model Reaction

A predefined mixture of di-peptide (305 mg), and D-fructose (75 mg) was added to the pre-heated (120° C.) propylene glycol in 50 ml capped Schott bottle. The pH of the reaction was adjusted with 0.01N NaOH (75 μl) to pH 7.5 to 8.5. The reaction mixture was stirred on a magnetic stirrer bar. The reaction mixture was heated up to 60 min, cooled to room temperature and stored at 4° C.

Sensory Profiling

For preliminary screening, panel members evaluated and described the aroma profiles of the process reactions. A maximum of 6 reaction samples was evaluated by sniffing at any given time. The process was repeated 3-times with randomly mixed set of samples to obtain higher degree of confidence and reliability of sensory data. For the most promising candidates, the trained sensory panel carried out additional profiling. A total of 17 panelists who had been trained for the evaluation of crumb and/or chocolate participated in the aroma-sniffing test. Tests were conducted individually (one person at a time) and the evaluation was repeated a few days later. The panelists were not aware of the fact that the same aromas were evaluated twice. The peptide-based reaction flavor sniff bottles were prepared one day before the test: A paper strip was dipped in the reaction flavor so that about 1 cm of the paper was moist. It was then shaken gently, cut to about 5 cm length and placed in a 20-ml glass jar with lid. The jars were coded with 3-digit codes and placed in random order on a tray. Before starting the exercise, the panelists sniffed commercial caramel, dark chocolate, cocoa and biscuit flavors as reference. In the case of liquor and chocolate tasting, panelists scored different attributes on a scale of 1–9. The tasting sessions were repeated 3 times with changing sample codes. Of all the dipeptides tested the following were attributed a good chocolate aroma: Tyr-Val, Val-Tyr, Leu-Leu, Pro-Val, Val-Phe, and Lys-Glu.

What is claimed is:

1. A flavor active compound obtainable by reacting Arg-Phe and optionally one or more peptides selected from the group consisting of, Ala-Glu, Glu-Ala, Val-Ala, Phe-Glu, Thr-Leu, Tyr-Val, Val-Tyr, Pro-Val, Asp-Ala, Ala-Asp, Trp-Ala, Ala-Asp, Trp-Ala, Phe-Ala, Ala-Phe, Tyr-Ala, Ala-Tyr, Lys-Glu, Lys-Phe, Val-Lys, Val-Phe, Leu-Leu, and Met-Tyr together and least one reducing sugar to a Maillard reaction under condition sufficient to form the flavor active compound.

2. The compound according to claim 1, wherein the reducing sugars consist of fructose, glucose, xylose, maltose, lactose, fucose, arabinose, galactose or rhamnose.

3. A food product, cosmetic product or pharmaceutical product containing a flavor effective amount of a flavor active compound according to claim 1.

4. The product of claim 3, in the form of a food product consisting of chocolate, milk, yogurt, pudding, ice cream, a beverage, baby food, a prepared food, or a pet food.

5. A process for preparing a flavor active compound which comprises subjecting Arg- Phe and optionally one or more peptides selected from the group consisting of, Ala-Glu, Glu-Ala, Val-Ala, Phe-Glu, Thr-Leu, Tyr-Val, Val-Tyr, Pro-Val, Asp-Ala, Ala-Asp, Trp-Ala, Ala-Asp, Trp-Ala, Phe-Ala, Ala-Phe, Tyr-Ala, Ala-Tyr, Lys-Glu, Lys-Phe, Val-Lys, Val-Phe, Leu-Leu, and Met-Tyr together and least one reducing sugars to a Maillard reaction with under conditions sufficient to form the flavor active compound.

6. The process according to claim 5, wherein the reducing sugars consist of fructose, glucose, xylose, maltose, lactose, fucose, arabinose, galactose or rhamnose.

7. The process according to claim 5, wherein the flavor active compound is added to a food product, cosmetic product or pharmaceutical product.

8. The process according to claim 7, wherein the flavor active compound is added to a food product consisting of chocolate, milk, yogurt, pudding, ice cream, a beverage, baby food, a prepared food, or a pet food.

9. A flavor active compound obtained by reacting Arg-Phe with fructose in a Maillard reaction under conditions sufficient to form the flavor active compound.

10. A food product containing a flavor effective amount of a flavor active compound according to claim 9.

11. The product of claim 10, wherein the food product is a chocolate confectionary product.

12. A process for preparing the flavor active compound of claim 9 which comprises reacting Arg-Phe with fructose in a Maillard reaction under conditions sufficient to form the flavor active compound.

* * * * *